(12) United States Patent
Yao et al.

(10) Patent No.: US 12,348,422 B1
(45) Date of Patent: Jul. 1, 2025

(54) LOAD-AWARE HARDWARE LOAD BALANCER

(71) Applicant: Cisco Technology, Inc., San Jose, CA (US)

(72) Inventors: Zhiyuan Yao, Île-de-France (FR); Yoann Desmouceaux, Paris (FR); Mark Townsley, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 219 days.

(21) Appl. No.: 18/153,865

(22) Filed: Jan. 12, 2023

(51) Int. Cl.
*H04L 47/125* (2022.01)

(52) U.S. Cl.
CPC .................................. *H04L 47/125* (2013.01)

(58) Field of Classification Search
CPC ........................ H04L 47/125; H04L 67/1008
See application file for complete search history.

(56) References Cited

U.S. PATENT DOCUMENTS

| | | | |
|---|---|---|---|
| 10,320,683 B2 | 6/2019 | Pfister et al. | |
| 10,452,436 B2 | 10/2019 | Kumar et al. | |
| 10,523,568 B2 | 12/2019 | Cherukuri et al. | |
| 10,680,955 B2 | 6/2020 | Pfister et al. | |
| 10,951,691 B2 | 3/2021 | Mishra et al. | |
| 2016/0080505 A1 | 3/2016 | Sahin et al. | |
| 2017/0149935 A1 | 3/2017 | van Bemmel | |
| 2017/0163724 A1* | 6/2017 | Puri | G06F 9/5083 |
| 2018/0375928 A1 | 12/2018 | Serenson, III et al. | |
| 2019/0394131 A1 | 12/2019 | Pfister et al. | |
| 2020/0021528 A1 | 1/2020 | Sharma et al. | |
| 2020/0120031 A1* | 4/2020 | Pfister | H04L 47/34 |
| 2020/0287962 A1* | 9/2020 | Mishra | H04L 43/065 |
| 2020/0328977 A1 | 10/2020 | Pfister et al. | |
| 2021/0058453 A1 | 2/2021 | Balasubramanian et al. | |

OTHER PUBLICATIONS

Rizzi et al., "Charon: Load-Aware Load-Balancing in P4", 2021 1st Joint International Workshop on Network Programmability and Automation. (Year: 2021).*
Borman et al., "TCP Extensions for High Performance", RFC 7323, Sep. 2014. (Year: 2014).*
Carmine Rizzi, et al., "Charon: Load-Aware Load-Balancing in P4", 2021 1st Joint International Workshop on Network Programmability and Automation. 7 pages.
Cole J. Smith, "An Analysis of the Alias Method for Discrete Random-Variate Generation", INFORMS Journal on Computing vol. 17, No. 3, Summer 2005, pp. 321-327.
Desmouceaux, Yoann, et al. "6lb: Scalable and application-aware load balancing with segment routing." IEEE/ACM Transactions on Networking 26.2 (2018): 819-834. 10.1109/TNET.2018.2799242ff. ffhal-02263364f https://ieeexplore.ieee.org/abstract/document/8293698.

(Continued)

*Primary Examiner* — Caroline H Jahnige
(74) *Attorney, Agent, or Firm* — Patterson + Sheridan, LLP

(57) ABSTRACT

Embodiments of the present disclosure provide a stateless, load-aware, hardware load balancer that can be implemented in networking environments such as Data Centers. Exemplary systems and apparatuses are able to fairly distribute connection requests while guaranteeing per-connection consistency (PCC) and minimizing processing latency.

18 Claims, 13 Drawing Sheets

(56) References Cited

OTHER PUBLICATIONS

Pit-Claudel, Benoît, et al. "Stateless load-aware load balancing in p4." 2018 IEEE 26th International Conference on Network Protocols (ICNP). IEEE, Sep. 2018, Cambridge, United Kingdom. pp. 418-423, https://ieeexplore.ieee.org/abstract/document/8526846.

Patel, Parveen, et al. "Ananta: Cloud scale load balancing." ACM SIGCOMM Computer Communication Review 43.4 (2013): 207-218. https://www.ndsl.kaist.edu/~kyoungsoo/ee807_2014/papers/ananta.pdf.

Eisenbud, Daniel E., et al. "Maglev: A fast and reliable software network load balancer." 13th {USENIX} Symposium on Networked Systems Design and Implementation ({NSDI} 16). 2016:523-535. https://www.usenix.org/system/files/conference/nsdi16/nsdi16-paper-eisenbud.pdf.

Handigol, Nikhil, et al. "Plug-n-Serve: Load-balancing web traffic using OpenFlow." ACM Sigcomm Demo 4.5 (2009): 6 https://www.cct.lsu.edu/~xuelin/openflow/sigcomm09-demo-loadbalancer.pdf.

Wang, Richard, Dana Butnariu, and Jennifer Rexford. "OpenFlow-Based Server Load Balancing Gone Wild." Hot-ICE 11 (2011): 12-12.

IPVS (IP Virtual Server) dated Aug. 8, 2012 available on-lie at: http://kb.linuxvirtualserver.org/wiki/IPVS.

Aghdai, Ashkan, et al. "Spotlight: Scalable transport layer load balancing for data center networks." IEEE Transactions on Cloud Computing 10.3 (2020): 2131-2145. https://arxiv.org/abs/1806.08455.

Zhang, Jiao, et al. "Fast switch-based load balancer considering application server states." IEEE/ACM Transactions on Networking 28.3 (2020): 1391-1404. https://ieeexplore.ieee.org/abstract/document/9061132.

Aghdai, Ashkan, et al. "In-network congestion-aware load balancing at transport layer." 2019 IEEE Conference on Network Function Virtualization and Software Defined Networks (NFV-SDN). IEEE, 2019. https://arxiv.org/pdf/1811.09731.pdf.

Miao, Rui, et al. "Silkroad: Making stateful layer-4 load balancing fast and cheap using switching asics." Proceedings of the Conference of the ACM Special Interest Group on Data Communication. 2017. https://dl.acm.org/doi/pdf/10.1145/3098822.3098824.

\* cited by examiner

| Rates | GSQ | GSQ2 | W-SAPP | SAPP | WCMP | ECMP |
|---|---|---|---|---|---|---|
| 64.5% | 0.91 | 0.92 | 0.89 | 0.91 | 0.71 | 0.50 |
| 70.5% | 0.92 | 0.94 | 0.91 | 0.93 | 0.71 | 0.54 |
| 84.5% | 0.93 | 0.95 | 0.93 | 0.94 | 0.60 | 0.55 |
| 92.5% | 0.93 | 0.96 | 0.94 | 0.96 | 0.65 | 0.56 |
| 100% | 0.95 | 0.98 | 0.97 | 0.97 | 0.71 | 0.57 |

TABLE 1

JAIN'S FAIRNESS INDEXES OF DIFFERENT LBS AT DIFFERENT TRAFFIC RATES.

*FIG. 5*

LOAD-AWARE HARDWARE LOAD BALANCER

TECHNICAL FIELD

The present disclosure relates to load balancing operations, for example, in data centers as they distribute network flows across application servers and guarantee per-connection consistency (PCC).

BACKGROUND

Load-Balancers play an important role in data centers as they distribute network flows across application servers and guarantee per-connection consistency. It may be challenging to make fair load-balancing decisions so that all resources are efficiently occupied yet not overloaded. Tracking connection states allows load balancers to infer server load states and make informed decisions, but at the cost of additional memory space consumption. This makes it hard to implement on programmable hardware, which has constrained memory but offers line-rate performance. In data centers where virtualized network functions and services can run on heterogeneous architectures with different processing capacities, uniformly distributing workload or network flows across application servers can lead to suboptimal resource allocation, leading to resource overload or starvation.

Embodiments of the present disclosure provide a stateless load-aware load balancer that has line-rate performance. Embodiments of the present disclosure may passively collect load states from application servers and employ the power-of-2-choices scheme to make data-driven load balancing decisions and improve resource utilization. Per-connection consistency is preserved statelessly by encoding server ID in a covert channel. Various designs and implementation details are described herein. Simulation results show performance gains in terms of load distribution fairness, quality of service, throughput and processing latency.

Embodiments of the present disclosure provide a stateless, load-aware, hardware load balancer in DCs, which (i) fairly distributes connections' requests, (ii) guarantees per-connection consistency (PCC), and (iii) minimizes additional latency due to its presence. The design choices used herein make embodiments of the present disclosure suitable for implementation on programmable hardware. Simulation results demonstrate improved load balancing fairness and better quality of service in contrast with existing load balancing (LB) mechanisms. Evaluations of throughput and processing latency demonstrate the advantage of hardware implementations.

In accordance with various embodiments of the present disclosure, a computer-implemented method of directing data traffic among computerized network devices connected over a data transmission network is provided. The computer-implemented method can include: receiving a data request; identifying application tasks currently underway at a plurality of network devices; calculating a current processing speed of the plurality of network devices based at least in part on the set of on-going application tasks; receiving feedback data embedded in packet headers corresponding to data traffic flows, wherein the feedback data comprises an instant server load state score, the current processing speed and a time stamp associated with each of the plurality of network devices; upon receipt of the feedback data, using the feedback data to calculate weights for the respective network devices, wherein the weights correspond to load states of each respective network device at respective times during the data traffic flows; using a weighted sampling mechanism for selecting candidate devices from the plurality of network devices; tabulating a load state score for each of the candidate devices that are available to complete the data request, wherein the estimated load state score for a respective network device is a function of the probed load state score, the current processing speed of the respective network device, and a time value corresponding to an elapsed amount of time since the load state score was last updated; and identifying a selected candidate device based at least in part on the tabulated load state scores to complete the data request.

In some embodiments, the computer-implemented method further comprises identifying the selected candidate device based at least in part on the lowest load state score among the candidate devices.

In some embodiments, receiving the data request comprises receiving the data request at an application server on the network.

In some embodiments, the computer implemented method further comprises receiving the feedback data at a load balancer used to calculate the weights for the plurality of network devices.

In some embodiments, the feedback data is embedded in at least one of TCP SYN-ACK packets, QUIC Hello packets, DTLS Hello Response, higher bits of a TCP timestamp, a key option field of a Generic Routing Encapsulation header, or the least significant bits of IPV6 addresses.

In some embodiments, tabulating a load state score for each of the candidate devices that are available to complete the data request comprises evaluating a queue length at each of the candidate devices with the time value.

In some embodiments, using a weighted sampling mechanism for the candidate devices comprises: generating probabilities of use and aliases for each of the plurality of network devices, wherein the probabilities distribute packets to network devices with higher weights that correspond to lower load states; tabulating index values, threshold values, and the aliases in an Alias Table; associating the index values with the respective network devices; determining a quantity of candidate devices that should be considered for completing the respective data request or data flow; using the quantity as a number of respective hash functions applied to the packet for selecting respective index values within the Alias Table; responsive to identifying a new task, associating a random number with each selected index value; for each selected respective index value of the Alias Table, determining the respective threshold value; providing either the index value or the alias to the score table by comparing the random number to the threshold for a respective index value; and identifying a selected candidate device to complete the respective data traffic flow as the candidate device having the lowest load state score.

In some embodiments, the computer-implemented method further comprises calculating the load state score based at least in part on the formula: $g'=\max(0, g-v(\text{Time}()-t))$, where $g'$ is a new score, $g$ is the previous load state score, $v$ is the processing speed, and Time() is a function that returns a current timestamp and $t$ is a previous timestamp.

In some embodiments, the computer implement method further comprises: if $g$ is 0, then assign $g'=0$; if $g$ is not 0, then compute $g'$; and if $g' \le 0$, assign $g'=0$, and update score $g$ to 0.

In some embodiments, the computer-implemented method further comprises: calculating the load state scores for respective network devices once at the initiation of the data traffic flow.

In some embodiments, the previous load state score (g) is calculated based at least in part on the set of on-going application tasks.

In some embodiments, the previous load state score (g) is selected based at least in part on a variance threshold factor corresponding to a degree to which of the application tasks on the respective network devices vary in a time domain, wherein: if the application tasks on a server side are lower than the variance threshold factor, in terms of workload, g can be defined as a current number of active connections; and if the application tasks on the server side are greater than the variance threshold factor in terms of workload, g can be computed as a sum of expected remaining computations for CPU-bound applications or storage use for IO-bound applications.

In some embodiments, the processing speed is calculated based at least in part on the on-going set of application tasks as follows: if the application tasks are CPU-bound, the processing speed corresponds to provisioned CPU numbers of the respective network device; if the application tasks are pure IO-bound, the processing speed corresponds to provisioned throughput of the respective network device; if the application tasks are profiled in computer memory at the respective network device, the processing speed corresponds to a previously calculated score according for available resources at the respective network device; and if the application tasks are profiled in computer memory at the respective network device, and the application tasks are profiled as complex, the processing speed corresponds to a moving average of sampled processing times.

In some embodiments, the sampled processing times comprise a time interval between the outbound reply and the data request.

In some embodiments, embedding feedback data in packet headers further comprises encapsulating the selected candidate device in the packet header.

In some embodiments, encapsulating an identifier for the selected candidate device comprises selecting a partition method from modulo or range division.

In some embodiments, selecting the partition method comprise selecting based at least in part on a transmission protocol of the data traffic flow, wherein for connection-id of QUIC connections, assigning connection-id rand ( ) k for a connection for server k (using modulo partition); for an IPv6 header, predefine 20-bit flow label field for each respective network device by using a different range division based on ranges $[k*2^20/N, (k+1)*2^20/N-1]$, where N is the number of respective network devices and k is the identifier for the selected candidate device; and for highest bits of TCP timestamp options, encode the identifiers for each of the respective network devices.

In some embodiments, the computer-implemented method further comprises identifying the selected candidate device with a load balancer having a processor and computer memory storing software running the computer-implemented method in the P4 programming language.

In accordance with other embodiments of the present disclosure, a system for directing data traffic among computerized network devices connected over a data transmission network is provided, the system comprising: a respective network device having a computer processor, computer memory and software stored in the computer memory, the respective network device configured to implement steps comprising: receiving a data request at the respective network device; identifying on-going set of application tasks at the respective network device; calculating a current processing speed of the respective network device based at least in part on the set of on-going application tasks; embedding feedback data in packet headers corresponding to data traffic flows from the respective network device back to other network devices, wherein the feedback data comprises an instant server load state score, the current processing speed and a time stamp; at least one other network device connected to the network and comprising a respective computer processor, a respective computer memory and respective software stored in the computer memory, wherein the other network device is configured to implement respective steps comprising: receiving the feedback data from a plurality of the respective network devices; using the feedback data to calculate weights for the respective network devices, wherein the weights correspond to load states of each respective network device at respective times during the data traffic flows; using a weighted sampling mechanism for randomly selecting candidate devices from the respective network devices; tabulating a load state score for each of the candidate devices that are available to complete a respective data traffic flow, wherein the load state score for a respective candidate device is a function of a previous load state score, the current processing speed of the respective candidate device, and a time value corresponding to an elapsed amount of time since the load state score was last updated; and identifying a selected candidate device to complete the respective data traffic flow.

In some embodiments, the processing speed is calculated based at least in part on the set of on-going application tasks as follows: if the application tasks are CPU-bound, the processing speed corresponds to provisioned CPU numbers of the respective network device; if the application tasks are pure IO-bound, the processing speed corresponds to provisioned throughput of the respective network device; if the application tasks are profiled in computer memory at the respective network device, the processing speed corresponds to a previously calculated score according for available resources at the respective network device; and if the application tasks are profiled in computer memory at the respective network device, and the application tasks are profiled as complex, the processing speed corresponds to a moving average of sampled processing times.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 is a table illustrating Jain's Fairness indexes of various Load Balancers in accordance with certain embodiments of the present disclosure.

DESCRIPTION OF EXAMPLE EMBODIMENTS

Overview

Figure 1:
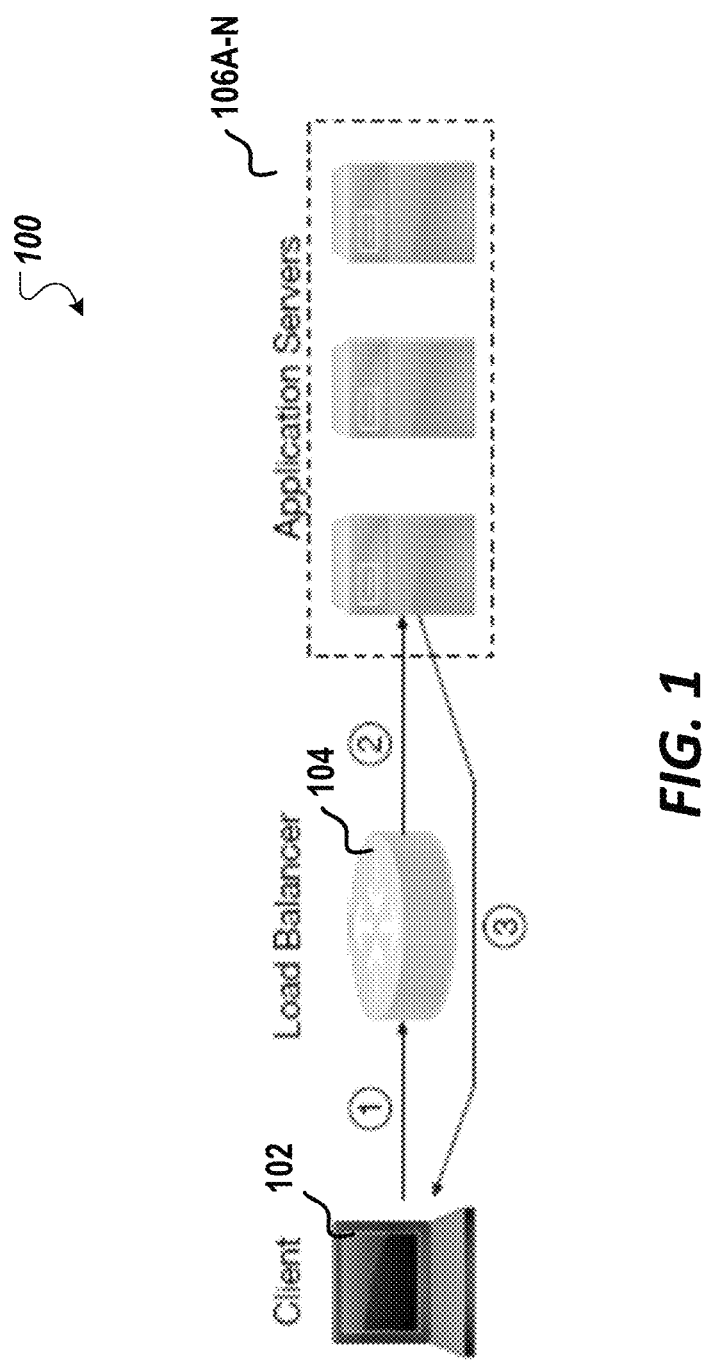
FIG. 1 illustrates an example environment, wherein embodiments of the present disclosure can be practiced.

Data centers (DCs) have seen a rising amount of connections to manage and users expect an elevated server responsiveness. Due to these conditions, applications are virtualized in replicated instances in data centers to provide scalable services. In some examples, a given service provided in a data center is identified by virtual internet protocol (VIP). A VIP may refer to an independent service running within a data center. Each application instance behind the VIP may be identified by direct internet protocol. In this architecture, load balancers (LBs) play an important role. A LB may be a networking device that is configured to distribute loads amongst a plurality of servers. LBs may distribute requests from clients among application servers while maintaining per-connection consistency (PCC). The term PCC may refer to an ability to map data packets belonging to the same connection to the same server even in the presence of changes in the number of active servers. Additionally, a LB may need to account for variable processing capacities amongst servers in addition to on-going workloads or jobs in order to make informed load balancing decisions. For example, some servers may have one central processing unit (CPU) while others may have a plurality of CPUs (e.g., eight CPUs) resulting in different processing capacities. Software-based load balancing solutions provide high flexibility and may be configured to account for detailed information about servers and tasks. However, these systems are slow in comparison to hardware LBs. Hardware-based load balancing solutions are subject to constraints in relation to flexibility and memory, but offer high speed, performance, throughput, and low-latency relative to software-based solutions. Embodiments of the present disclosure address various challenges associated with hardware LBs and provide load-aware hardware LBs by way of easily implementable heuristic load balancing mechanisms, such as, but not limited to, Equal Cost Multi Path (ECMP).

The Open Systems Interconnection model (OSI model) framework comprises seven different abstraction layers of a communication system through which data flows: a Physical layer (Layer-1), a Data link layer (Layer-2), a Network layer (Layer-3), a Transport layer (Layer-4), a Session layer (Layer-5), a Presentation layer (Layer-6), and an Application layer (Layer-7). Layer-7 application load balancers generally perform well in terms of load balancing fairness because they are able to account for application layer information. However, application layer load balancers require deeper packet investigation and inspection which is resource intensive and slows processing time. Moreover, complex and/or intelligent algorithms associated with such systems may incur high performance overhead and processing latency, therefore reducing throughput. Additionally, such load balancers are generally specific to particular applications (e.g., an Apache LB is incompatible with an NGINX application).

Network load balancers play an important role in data centers and help achieve better quality of service (QOS) with less provisioned resources if workload is fairly distributed (e.g., overloaded or under-utilized application servers are avoided). They are also expected to be highly performant, ideally forwarding packets at line-rate. Unlike Layer-7 LBs (e.g. Nginx), Layer-4 LBs are agnostic to specific types of applications or application-layer protocols, and they do not have observations on instantaneous load states on Application Server clusters. Without such observations, load balancing decisions made by network LBs are generally suboptimal. On the other hand, extracting observations from the data plane and making complicated analysis before making load balancing decision incurs processing latency and reduces LB throughput. A simple load balancing strategy of a Layer-4 LB is using an ECMP mechanism and forwarding a new-coming flow to a DIP (Destination IP) indexed by its 5-tuple hash in a bucket table entry. This approach distributes workload homogeneously across all servers with little performance overhead-simply matching and forwarding. However, it risks overloading servers with less provisioned computational resources, leading to suboptimal resource utilization.

Embodiments of the present disclosure provide transport layer (e.g., Layer-4) hardware load balancing systems that are compatible with a variety of application types and formats. By operating in the transport layer (e.g., Layer-4), packets are inspected in a shallow way thus ensuring lower per-packet processing latency. Embodiments of the present disclosure propose a mechanism that facilitates load-aware (e.g., server resource utilization awareness such as CPU, input/output (IO), or application load states) load balancing decisions based on passive, in-network feedback from the application servers (e.g., on a per-flow basis). In some embodiments, actual load states are encoded in packets (e.g., (Transmission Control Protocol (TCP) SYN-ACK packets, Quick UDP Internet Connection (QUIC) Hello packets, Datagram Transport Layer Security (DTLS) Hello Response) while offering line-rate performance on hardware.

To guarantee PCC, stateful LBs may continuously track the state of the connections. Using advanced hashing mechanisms (e.g., consistent hashing), server pool updates have little impact on the hashing table therefore the amount of disrupted connections is decreased. However, stateful LBs require additional memory space for flow tables to store connection states. When encountering denial-of-service (DOS) attacks, flow tables risk being filled by malicious flows and no longer track legitimate flows. If there is LB failure, the tracked connection states are lost and all connections via the failed LB need to be re-established, which degrades quality of service (QOS). Stateless LBs may use alternative mechanisms to recover the right server destinations, without keeping the flows' states. They may encode server identifier (id) information in packet headers and daisy-chain two possible server candidates, to retrieve a potentially changed flow-server mappings.

Embodiments of the present disclosure may adopt stateless load balancing schemes and encapsulate the server id inside packets. In particular, the TCP timestamp option can be used to transport this information. To improve load balancing fairness, different mechanisms are proposed to evaluate server load states before making load balancing decisions. In some implementations, Segment Routing (SR) and power-of-2-choice can be utilized to daisy chain two servers and let them decide, based on their actual load states, whether or not the new flow should be accepted. Another approach is to periodically poll servers' instant "available capacities". In some examples, Ridge Regression is used to predict server load states and compute the relative "weight" of each server for Weighted Costed Multi-Path (WCMP). In some examples, the servers are clustered based on their load states, where clusters with less workload are prioritized. The servers notify the LBs about load state changes if their resource consumption surpasses pre-defined thresholds. In other examples, a heuristic that combines the queue lengths of active flows and provisioned server capacity to determine server load states is utilized.

Unlike existing techniques, embodiments of the present disclosure passively poll and retrieve the server load when a new flow is assigned to it. In some embodiments, the feedback can be used to predict the future server load states and make informed and fair load balancing decisions, which improves resource utilization and QoS. To optimize performance in terms of throughput and latency, different hardware solutions are proposed. Silkroad implements LB functions on dedicated hardware device, while other designs implement a hybrid solution combining software and hardware LBs to guarantee PCC. As a hardware solution, embodiments of the present disclosure can be implemented on a NetFPGA board using P4-NetFPGA tool-chain to achieve low jitter and delay.

In accordance with various embodiments of the present disclosure, a stateless, load-aware, hardware load balancer is provided. Certain aspects of LB performance are targeted including availability, fairness, and performance.

In some implementations, availability is achieved by encapsulating a chosen server id in the covert channel of packet headers. Different covert channels are available (e.g., connection-id of Quick UDP Internet Connections (QUIC) connections and the least significant bits of Internet Protocol version 6 (IPv6) addresses). Embodiments of the present disclosure may also use higher-bits of TCP timestamp options.

In some implementations, fairness is ensured by making load balancing decisions on predicted server load states based on passive feedback from application servers with actual load states encoded in packets (e.g., SYN-ACK packets). In certain implementations, a plurality of factors can be integrated simultaneously (e.g., queue lengths and processing speed).

In some implementations, high performance is achieved by implementing functionalities on programmable hardware to boost performance and achieve low latency and high throughput. The inventors have confirmed improved performance using embodiments of the present disclosure through simulations and experiments. Physical testing also demonstrates the high throughput of exemplary boards.

Example Environment

Referring now to the drawings, FIG. 1 illustrates an environment 100, wherein various embodiments of the present disclosure can be practiced. As depicted, the environment comprises a client 102, load balancer(s) 104, and a plurality of application servers 106A-N.

As depicted in FIG. 1, on receipt of a new request (step 1), the load balancer 104 may randomly select an application server from the plurality of application servers 106A-N (e.g., application pool) to which the request is forwarded (step 2), based on the hash over the 5-tuple of the connection. The load balancer 104 may employ an ECMP load balancing mechanism. The 5-tuple may correspond with an IP source, IP destination, protocol number, TCP source port, and TCP destination port. Replies are sent back directly to the client 102 instead of traversing the load balancer 104 (step 3), for example, in direct source return (DSR) mode. DSR mode may be used so that the load balancer 104 avoids handling 2-way traffic and becoming a throughput bottleneck between application servers 106A-N and client(s) 102. As discussed above, though easy to implement, ECMP is agnostic to the server load states. As ECMP randomly distribute workloads, new requests may be forwarded to overloaded servers, reducing load balancing fairness. ECMP is also not able to guarantee PCC since server pool updates change the DIP entries in the hash table, which potentially forwards subsequent packets of established connections to different servers and breaks connections, for example between a given application server and a client.

Exemplary Operations

Figure 2A:
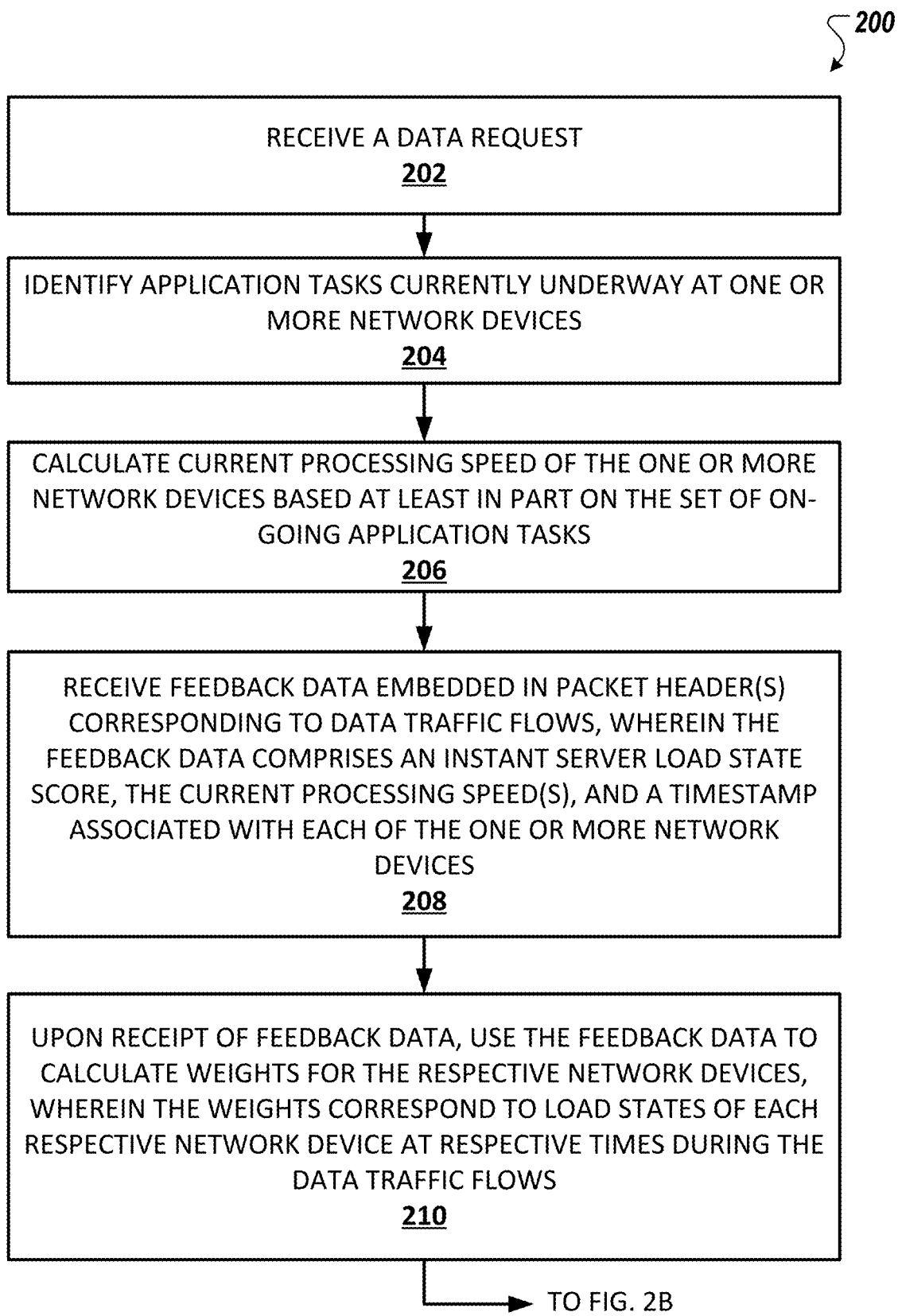
FIGS. 2A-B is a flow diagram of an example method for directing data traffic among computerized network devices in accordance with certain embodiments of the present disclosure.
Figure 2B:
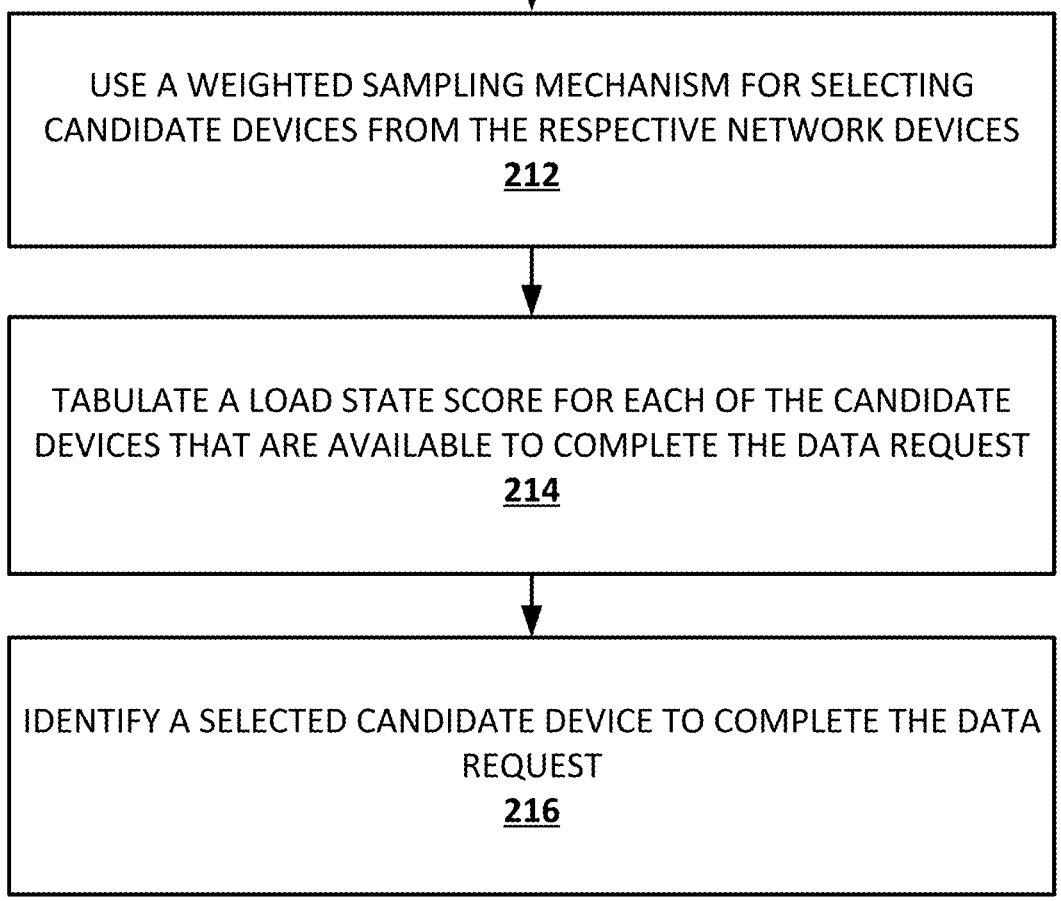

Referring now to FIGS. 2A-B, an example method 200 for directing data traffic among computerized network devices connected over a data transmission network is provided herein. In some embodiments, the method 200 may be performed in the environment 100 described in relation to FIG. 1 (e.g., comprising a client 102, a load balancer 104, and a plurality of application servers 106A-N). In some embodiments, the method 200 may be at least partially implemented or performed by and/or in conjunction with a separate or remote device, controller, or computing device, such as the system 700 described below in connection with FIG. 7 below.

Beginning at step/operation 202, the method 200 includes receiving (e.g., intercepting, obtaining, or the like) a data request, for example by a network device such as a load balancer (e.g., hardware, transport layer, or Layer-4 load balancer discussed in more detail below). The data request may be or comprise an Application Programming Interface (API) call to provide a service and/or information.

Subsequent to step/operation 202, the method 200 proceeds to step/operation 204. At step/operation 204, the method 200 comprises identifying, by the first network device or load balancer, application tasks that are currently underway at a plurality of other network devices. In some embodiments, identifying the application tasks further includes identifying one or more characteristics that are associated with the application tasks (e.g., classifications, types, categories, sets, parameters, or the like). Each application task may take the form of a TCP connection that needs to be consistently handled by a particular server for the duration of a connection in order to guarantee PCC.

Subsequent to step/operation 204, the method 200 proceeds to step/operation 206. At step/operation 206, the method 200 comprises calculating (e.g., determining, identifying, or the like), by the first network device or load balancer, a processing speed of the plurality of other network devices based at least in part on the set of on-going application tasks (e.g., based on application task classifications, types, and/or parameters).

Subsequent to step/operation 206, the method 200 proceeds to step/operation 208. At step/operation 208, the method 200 comprises receiving, by the first network device or load balancer, feedback data embedded in the packet header(s) corresponding to data traffic flows from the plurality of other network devices, wherein the feedback data comprises an instant server load state score, the current processing speed(s), and a timestamp associated with each of the one or more other network devices. In some embodiments, the instant server load state score can be computed by a network device or load balancer based on its local view of resource utilization as described in more detail below in conjunction with FIG. 3A.

Subsequent to step/operation 208, the method 200 proceeds to step/operation 210. At step/operation 210, the method 200 comprises, upon receipt of the feedback data, by the first network device or load balancer, using the feedback data to calculate weights for each of the plurality of other network devices, wherein the weights correspond to load states of each respective network device at respective times during the data traffic flows.

Turning to FIG. 2B, subsequent to step/operation 210, the method 200 proceeds to step/operation 212. At step/operation 212, the method 200 comprises using a weighted sampling mechanism (e.g., using the weights to generate an Alias Table) for selecting candidate devices from the plurality of network devices.

Subsequent to step/operation 212, the method 200 proceeds to step/operation 214. At step/operation 214, the method 200 comprises tabulating, by the first network device or load balancer, a load state score for each of the candidate devices that are available to complete the data request (e.g., data traffic flow).

Subsequent to step/operation 214, the method 200 proceeds to step/operation 216. At step/operation 216, the method 200 comprises identifying, by the first network device or load balancer, a selected candidate device (e.g., with a lowest load state score) to complete the data request (e.g., data traffic flow).

Embodiments of the present disclosure rely on a plurality of tables (e.g., three tables) and at least one server agent to achieve stateless hardware load-aware load balancing (e.g., on NetFPGA). In some examples, two tables are constructed and managed by the control plane. The Alias Table facilitates server selection based on various weights with low computational complexity and low memory space consumption. The IP Table is used to map server id to actual IP address. In some embodiments, the Score Table is updated in the data plane on a per-flow basis.

Figure 3A:
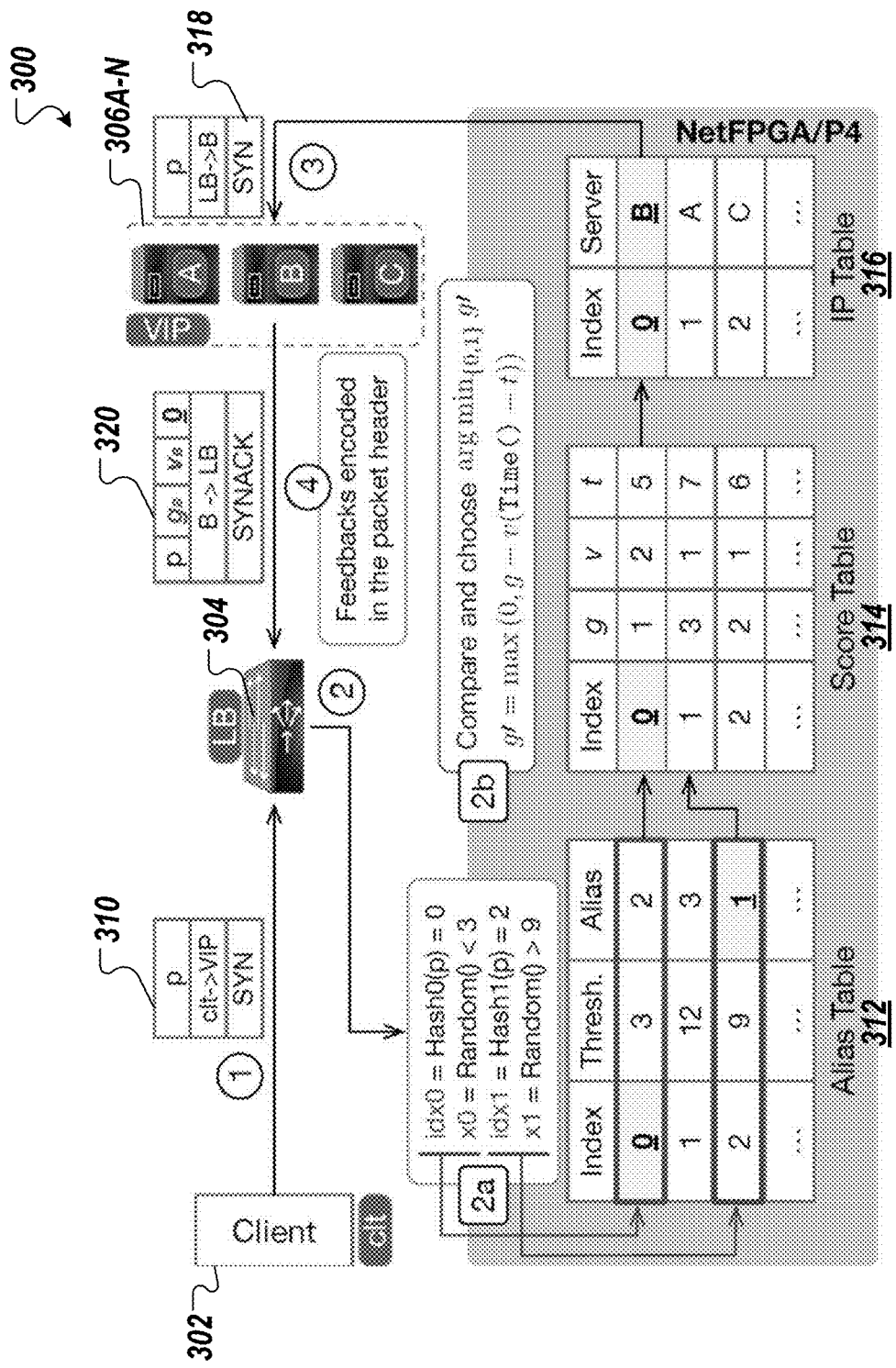
FIGS. 3A-B is a schematic diagram depicting an exemplary method performed by a client, a load balancer, and a plurality of servers in accordance with certain embodiments of the present disclosure.
Figure 3B:
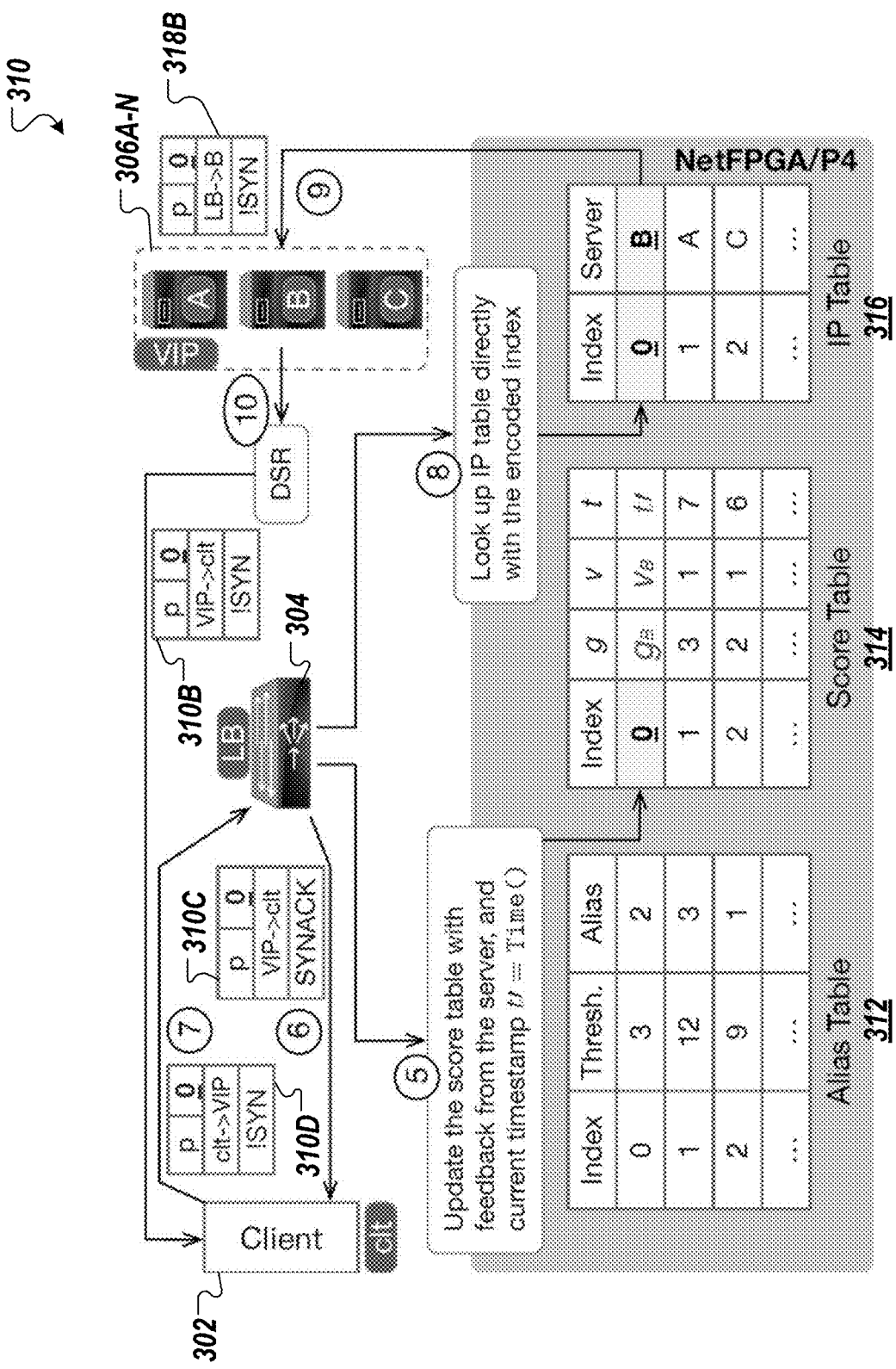

Referring now to FIG. 3A and FIG. 3B, schematic diagrams in accordance with certain embodiments of the present disclosure are provided. In particular, FIG. 3A and FIG. 3B depict an exemplary method performed by a client 302, a load balancer 304, and a plurality of servers 306A-N.

In an example protocol for establishing a connection between two computing devices (e.g., SYN-ACK protocol or ACK handshake), a first computing device transmits a SYNchronize packet to a second computing device, which sends back a SYNchronize-ACKnowledge packet in return. The first computing device then transmits an ACKnowledge packet to the second computing device and a connection or communication channel is established.

As depicted in FIG. 3A, beginning at step/operation 1, a SYN packet 310 reaches the LB 304 from the client 302. For example, the client 302 (designated "clt" in the depicted SYN packet 310) may send a request to a data center (designated VIP in the depicted SYN packet 310) to establish a connection with a particular service. As depicted in FIG. 3A, the SYN packet 310 is received or intercepted by the LB 304 which is configured to determine which of the plurality of servers 306A-N should perform the request. To ensure a high QoS, the LB 304 may be configured to direct a received request to a server from the plurality of servers 306A-N that has a lower workload. In some embodiments, the LB 304 employs a random weighted sampling process, such as but not limited to, the Alias Method.

Embodiments of the present disclosure employ power-of-n-choices/power-of-2-choices and apply two hash functions to the 5-tuple of the packet. At step/operation 2a, the two hashes are then used as indexes in the Alias Method to generate two random server candidates based on their relative weights. The Alias Method is a probabilistic algorithm which, given initial weights, generates a table of probabilities and "aliases" with O (n) memory space complexity, where n is the number of servers. The role of the Alias Method is to distribute with higher chance the flows to servers with higher weights. The weights can be derived from servers' instant load states and are updated periodically. In some implementations, the update time interval is 1 second.

In accordance with certain embodiments of the present disclosure, the LB 304 may use a weighted sampling mechanism, for example, generate an Alias Table 312, a Score Table 314, and an IP table 316 that can be used to identify two or more server candidates for a given request. By employing the power-of-2-choices or the power-of-n-choices to select at least two server candidates instead of identifying a single server candidate, servers with higher processing capacity (e.g., lower load state) are given a higher probability of being selected. It should be understood that the number of servers, n, is a tunable parameter that allows a designer to balance accuracy with respect to identifying the optimal server for a given task with processing latency that is incurred based on the number of candidates.

In the example depicted in FIG. 3A and FIG. 3B, generating a server candidate index requires two input values: an entry index and a random number. In various embodiments, the flow id, packet, and/or request id is used as input to generate an index for each server as an output. In some embodiments, the weights for each server may be determined based at least in part on server capacity (e.g., number of CPUs, IO, difference of CPU processing speeds such as different frequencies on different physical machines, and the like). As illustrated, each row of the Alias Table 312 corresponds to a particular server (Server "A", Server "B", and Server "C" from the plurality of servers 306A-N). As shown in FIG. 3A and FIG. 3B, each entry of the Alias Table 312 has a threshold value and an alias value. The former determines which value is chosen, while the latter is the alternative index with respect to the entry index initially selected. If the random number is bigger than the threshold, the output of the Alias Method is the alias, otherwise the output is the entry index. In the given example, four values are taken into consideration. As depicted in FIG. 3A, the idx0=0 and idx1=2 are the two initial entry indexes of the table. Given that the random value is smaller than the threshold x0<3, the first output is the entry index 0. Similarly, since x1≥9, the second output is the alias 1.

The two values obtained from the Alias Method are then used as the ids of the two server candidates. As depicted in FIG. 3A, the score table 314 stores values/information associated with loads for the plurality of servers 306A-N. In some implementations, their associated scores are computed with the function:

$$g'=\max(0, g-v(\text{Time}(\ )-t)),$$

In the above formula:
g' is the new server score;
g is the previous server score (e.g., ground truth or actual server load);
v is the "velocity" or the server processing speed;
Time ( ) is a function that returns current timestamp; and
t is the previous timestamp.

The three variables, g, v and t, are saved in the Score Table 314. In some examples, the score g is the amount of work remaining or the number of active flows on the server to execute. In various embodiments, g can be estimated or may be a probed load state state score derived from feedback data. In some examples, the score g can be derived from the server side based on application type. For example, if tasks on the server side have low variance in terms of workload, g can be defined as the number of active connections. If tasks on the server side vary a lot in terms of workload, then g can be computed as the sum of expected remaining computation (for CPU-bound applications) or storage (for IO-bound applications).

In some examples, the processing speed v is derived from the average flow completion time (FCT) on the server side. If tasks are pure CPU-bound, v can be defined based on the provisioned CPU numbers of the server.

The timestamp t may correspond to the last time the score was updated. The time difference Time ( )-t measures the elapsed time since the previous update. The intuition of this function is to predict the remaining amount of tasks or queue length that a server needs to accomplish. A higher score translates into a busier server. The max ( ) function ensures that the score stays non-negative. In various implementations, a script can be run on each server to calculate a weighted sum representing CPU processing speed or the like.

Once the scores of the two servers are computed, the server with lower score is assigned to the flow. In the example in FIG. 3A and FIG. 3B, supposing that Time=8, then the scores of index 0 and 1 are computed as $g_0'=\max(0, 1-2*(8-5))=0$ and $g_1'=\max(0, 3-1*(8-7))=2$, respectively. Since server 0 has a lower inferred server load state, the selected server is the server with index 0, which is then mapped to Server "B" in the IP Table 316.

If tasks are pure IO-bound, v can be defined based the provisioned throughput of the server. For example, given an IO-bound application, suppose that the current time step Time ( )=8, the remaining amount of data to be transmitted for server 0, $g_0=33$ (obtained at time step 5) and for server 1, $g_1=6$ (obtained at time step 7), the network throughput of the two servers are respectively 10 Gigabit per second (Gbps) and 1 Gbps, then the updated scores of index 0 and 1 are $g'_0=\max(0, 33-10*(8-5))=3$ and $g_1'=\max(6-1*(8-7))=5$. The selected server is the server with index 0, which is then mapped to Server "B" in the IP table 316.

If the application is well profiled, v can be defined based on the calculated score based at least in part on the available resources of the server. For example, given an application that relies 60% on CPU power and 40% on IO speed, suppose that the current time step Time ( )=8, the remaining number of tasks for server Od $g_0=10$ (obtained at time step 5) and for server 1, $g_1=6$ (obtained at time step 7), the network throughput of the two servers are respectively 10 Gbps and 1 Gbps and the provisioned number of CPUs are respectively 4CPU and 2CPU, then the processing speed for the two servers can be derived as: for server 0:

$$\text{For server 0: } v_0 = \frac{4}{2}*60\% + \frac{10}{1}*40\% = 5.2$$

$$\text{For server 1: } v_1 = \frac{2}{4}*60\% + \frac{1}{10}*40\% = 0.7$$

Then the updated scores of index 0 and 1 are:

$$g_0'=\max(0, 10-5.2*(8-5))=0$$

$$g_1'=\max(6-0.7*(8-7))=5.3.$$

The selected server is the server with index 0, which is then mapped to Server "B" in the IP table 316.

If the application is complex to profile on the server side, v can be derived from a moving average of sampled processing times from the application side (for instance, the time interval between outbound reply and inbound request). For example, given a QoS sensitive application, suppose that the current time step Time ( )=8, the remaining number of tasks for server 0, $g_0=10$ (obtained at time step 5) and for server 1, $g_1=6$ (obtained at time step 7), the moving average of flow completion time of the two servers are respectively 250 ms and 500 ms, then the processing speed for the two servers can be derived as:

$$\text{For server 0: } v_0 = \frac{1}{0.25} = 4$$

$$\text{For server 1: } v_1 = \frac{1}{0.5} = 2$$

then the updated scores of index 0 and 1 are:

$$g_0'=\max(0, 10-4*(8-5))=0$$

$$g_1'=\max(6-2*(8-7))=4$$

The selected server is the server with index 0, which is then mapped to Server "B" in the IP table 316.

An optimized procedure to save compute cycles is provided as follows:
1. First check if g is 0, then directly assigns g'=0
2. If g is not 0, then compute g'=g-v*(Time ( )-t)
3. if g'<=0, let g'=0, and update score g to 0 (so as to avoid complicated computation for next packet arrival).

The power-of-2-choices concept is applied as it has lower computational complexity than calculating the minimum yet it offers recognizable performance gains. For this and other reasons, embodiments of the present disclosure better handle large-scale DCs.

Referring to the Score Table 314, at step/operation 2b, embodiments of the present disclosure calculate and compare the load states of the two candidate servers from the plurality of servers 306A-N. The server with lower score is assigned to the new flow. In the example depicted in FIG. 3A, the IP of the selected server (Server "B") is retrieved from the IP Table at step/operation 3 (as depicted, packet 318).

At step/operation 4, along with the reply to the connection request, the agent on Server "B" encapsulates its load state information and its server id in the packet header 320. In the example shown in FIG. 3A, packet header 320 includes a SYN-ACK acknowledgement. In some implementations, the server load state (e.g., $g_b$ denoting the current load state, $v_b$ denoting the current estimated processing speed) is encoded inside the key option field of the Generic Routing Encapsulation (GRE) header, which encapsulates the original IP packet. In some embodiments, updated information is encoded in each SYN-ACK packet, but not in subsequent packets. The Score Table 314 can be updated on a per-request or per-packet basis. In a use case where flows are short and traffic rate is high, the load balancer is able to receive frequent updates since there will be a huge amount of SYN-ACK packets carrying server load state information to the LB 304. This "passive feedback" design differs from existing LBs and reduces communication overhead with respect to periodic polling mechanisms yet keeps LBs informed before application servers reach a critical load level. In a use case where flows have long durations and the traffic rate is low (e.g., where the LB 304 may not receive frequent updates via passive feedback), an additional periodic traffic generator can be deployed alongside the LB 304 to generate short probing flows and get timely observation over the latest system observation, with limited probing overhead.

Referring now to FIG. 3B, at step/operation 5, on reception of the SYN-ACK packet 310B from the server (DSR is disabled for step/operation 4 with the server agent), the LB 304 updates the load state information in the Score Table 314 (e.g., as shown, with new values for $g_b$ and $v_b$). The LB 304 also calculates a current timestamp, t'.

At step/operation 6, the packet 310C is decapsulated and the response 310D is forwarded back to the client 302. The server id ("0" in the example depicted in FIG. 3A) is preserved in the higher bits of the TCP timestamp option. In this way, the subsequent packets from the same flow (step/operation 7 in FIG. 3B) contain the server id. 2IPv6's flow id field can also be exploited to store server load information. Embodiments of the present disclosure choose the key option field of GRE header to achieve better compatibility between IPv4 and IPV6. The index value may be encoded in the packet header. In the example of a TCP connection, the index value can be encoded in the TCP timestamp to ensure that subsequent packets are sent to the same server. In other words, the server information (e.g., $g_b$ and $v_b$ values) can be removed from the packet(s) 310B, 310C that are sent to the client 302, while the index is preserved. Utilizing the TCP timestamp option further ensures that the index and/or encoded information will not be modified during the transmission of the packets. Accordingly, the LB 304 can utilize the IP Table 316 for subsequent network requests and only make a load balancing decision in relation to the initial packet, thus providing a low-latency solution. In addition to the TCP timestamp, alternative covert channels and protocols are supported including connection-id of QUIC connections and the least significant bits of IPV6 addresses. Accordingly, while FIG. 3A and FIG. 3B provide an example based on TCP traffic, embodiments of the present disclosure can be extended to other transport layer protocols (e.g., QUIC). Load balancers can be configured to obtain a server load state on a once per-flow basis (e.g., when a server sends a TCP SYN-ACK, QUIC Hello, or DTLS Hello Response packet back to the client) so that DSR mode is not violated and without requiring the load balancers to handle 2-way traffic, thus increasing throughput.

In various examples, covert channels can be used in conjunction with different partition methods (e.g., modulo or range division). For example, connection-id of QUIC connections, e.g. assign connection-id rand ( ) k for a connection for server k (using modulo partition). In some examples, the system may predefine 20-bit flow label field each server in IPv6 headers, for example, using a different range division based on ranges [k*2^20/N, (k+1)*2^20/N−1], where N is the number of servers and k is the server ID. In some examples, the highest bits of TCP timestamp options are utilized (e.g., with the highest 8 bits, server IDs for 2^8=256 servers can be encoded).

In some embodiments, server load information can be stored in the 20-bit IPV6's flow label field, using the higher 10 bits to encode the g (current queue length) and the lower 10 bits to encode the processing speed. In some examples, the key or sequence number option field of GRE header can be used to achieve better compatibility between IPv4 and IPV6, when the tunnels between the load balancers and the servers are implemented by way of GRE tunnels (e.g., use the higher 16 bits to encode the g (current queue length) and the lower 16 bits to encode the processing speed. In some implementations, where segment routing (SR) is enabled between load balancers (LB0, LB1, . . . ) and servers (S0, S1, S2, . . . ), for example, whenever LB0 receives a connection (SYN packet) and assigns it to S1, LB0 inserts SR header (SRH) with segments {S1, LB0} and sends it to S1, to make sure SYN-ACK packet will be directed back to LB0. In the SYN-ACK packet, the server encodes its queue occupation g and processing speed v in the destination IPv6 address as [LB0::g:v]. Then LB0 decodes this packet and stores g and v in the score table. In an embodiment where the tunnels between load balancers and servers are instantiated by Internet Protocol Security (IPSec), the reserved 16 bits can be used to encode the g (current queue length, with higher 8 bits) and to encode the processing speed (with the lower 8 bits). In an embodiment where the tunnels between load balancers and servers are instantiated by L2TP, the optional Ns and Nr fields can be used to, respectively, encode the g (current queue length, with 16-bit Ns) and to encode the processing speed (16-bit Nr). In an embodiment where the tunnels between load balancers and servers are instantiated by Secure Socket Tunneling Protocol (SSTP), the reserved (7 bits) field and the reserved (4 bits) in the length field can be used to, respectively, encode the g (current queue length) and to encode the processing speed.

Returning to FIG. 3B, at step/operation 8, the load balancer 304 retrieves the server's IP address from the IP Table 316 and redirects immediately to the right server (e.g., Server "B") at step/operation 9. The server (e.g., Server "B" from the plurality of servers 306A-N) can directly answer to the client 302 using DSR mode at step/operation 10 till the end of the flow. The DSR mode allows the server to bypass the LB 304 and send information directly to the client, alleviating the LB 304 from processing both incoming and outgoing packets in order to improve throughput.

Experimental Results

As noted above, embodiments of the present disclosure can be evaluated from three perspectives, namely: (i) acceptance rate of covert channel existence in packet headers, (ii) performance gain in terms of load balancing fairness and QoS, and (iii) throughput and additional processing latency using P4-NetFPGA implementation, each discussed in more detail below.

Covert Channel Acceptance

To understand how the Internet would react to the presence of timestamp option in the TCP header, requests were sent from Paris to over 60,000 distinct random IP addresses. The results obtained are the following:

NO CONNECTION=45019

SUCCESS=12876

FAILURE=5787

TOTAL=63682

The code NO CONNECTION is the number of connections which have not received any response regardless of the presence of the timestamp option. The code SUCCESS is the number of connections that have answered to a packet with the timestamp option. The code FAILURE is the number of connections that have not answered to a packet with the timestamp option but answered to packets without timestamp option. Pruning the first case where the IP addresses are not associated to any device or service is not available and analyzing only SUCCESS and FAILURE cases gives an acceptance rate of 68.99%. This experiment does not study the different geographic locations of the clients and servers or other factors yet it validates that the stateless design described herein is operable for a majority of end hosts. It is also in accordance with the high acceptance rate (over 86%) obtained by experimenting on a larger scale of testbed.

Load Balancing Fairness

A simulator was built with two LBs and 64 application servers with different processing capacities to study the load balancing performance in terms of workload distribution fairness. In particular, half of the application servers have 2 times higher processing capacities than the other half. Three episodes of 50,000 flows that last 500 milliseconds (ms) on average are simulated as Poisson traffic at different variances. The traffic rates are normalized by the total server cluster processing capacities.

Figure 4A:
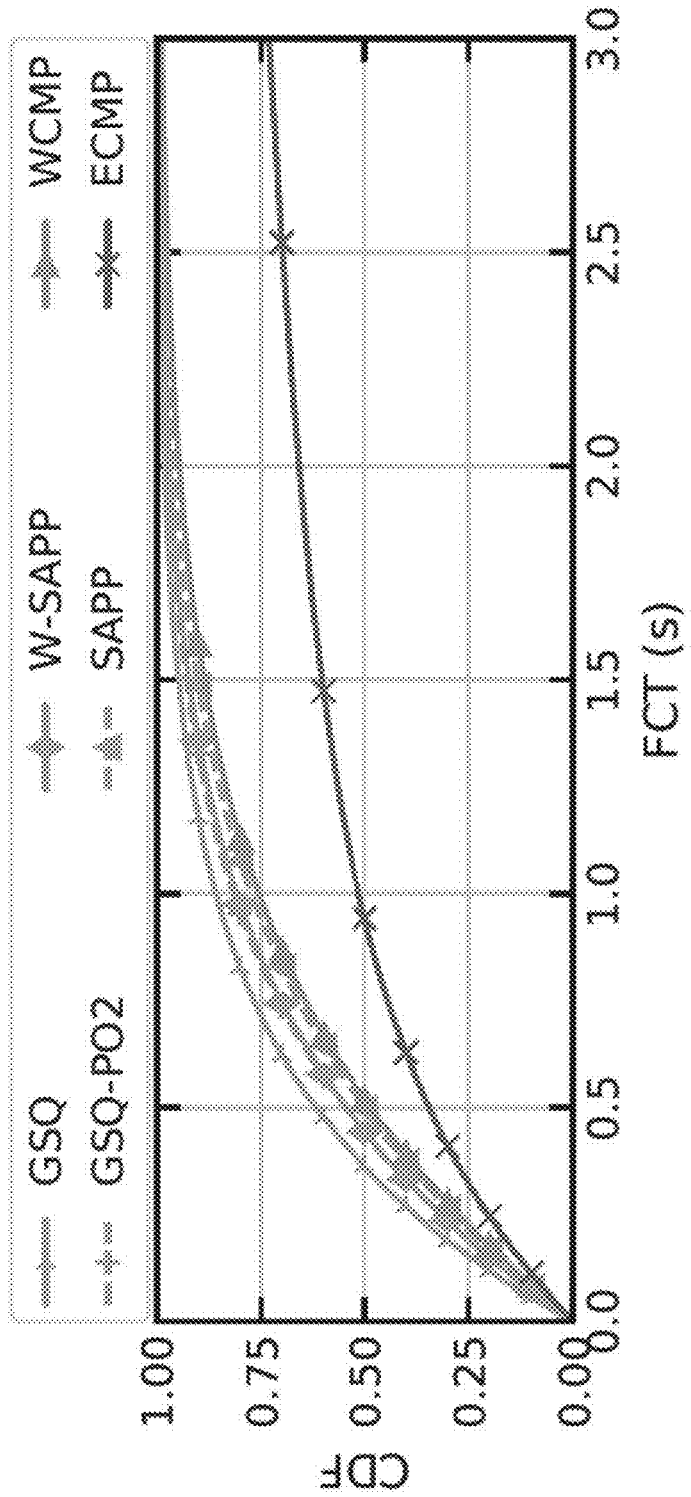
FIGS. 4A-D are graphs depicting cumulative distribution functions of flow completion times (FCTs) in accordance with certain embodiments of the present disclosure.
Figure 4B:
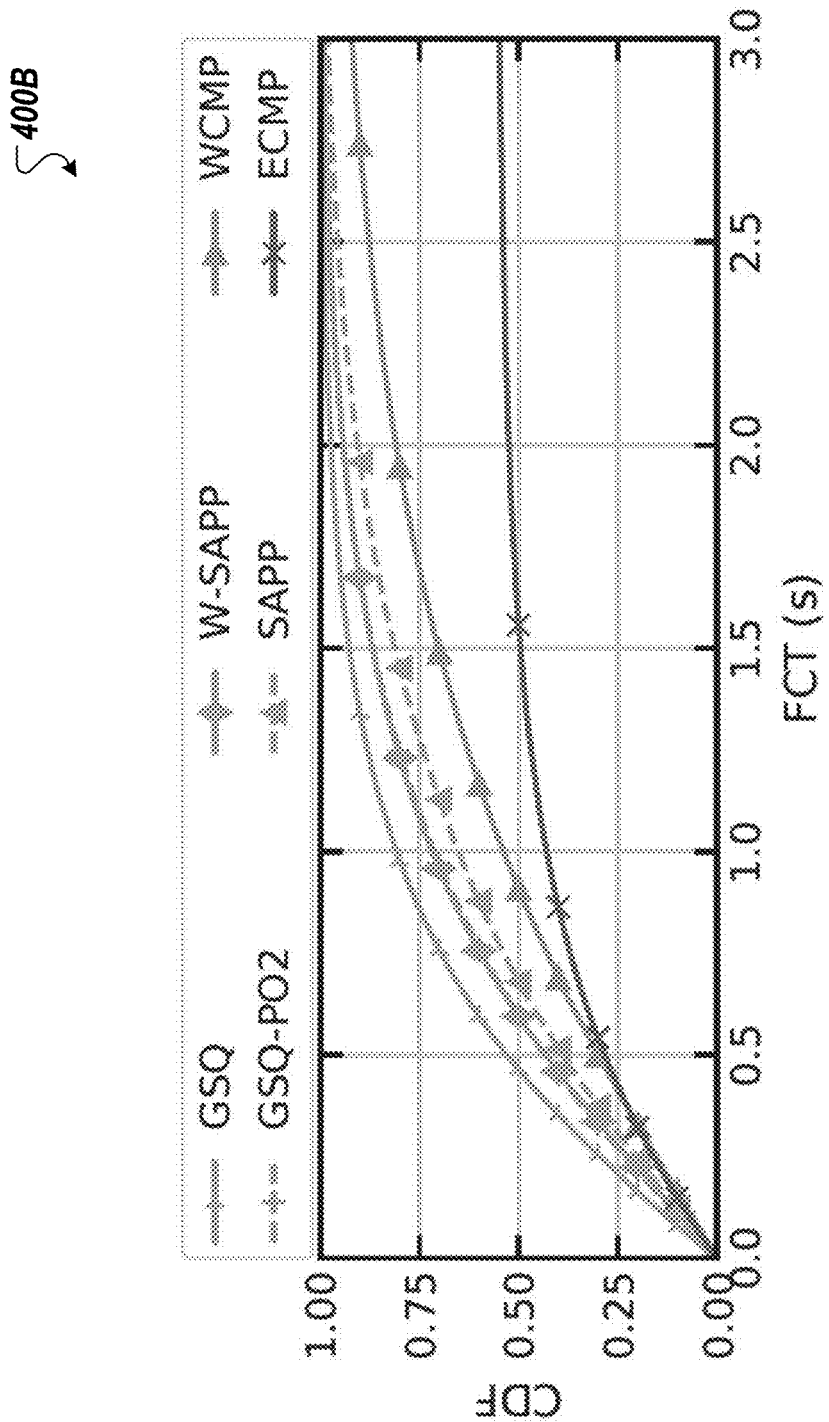
Figure 4C:
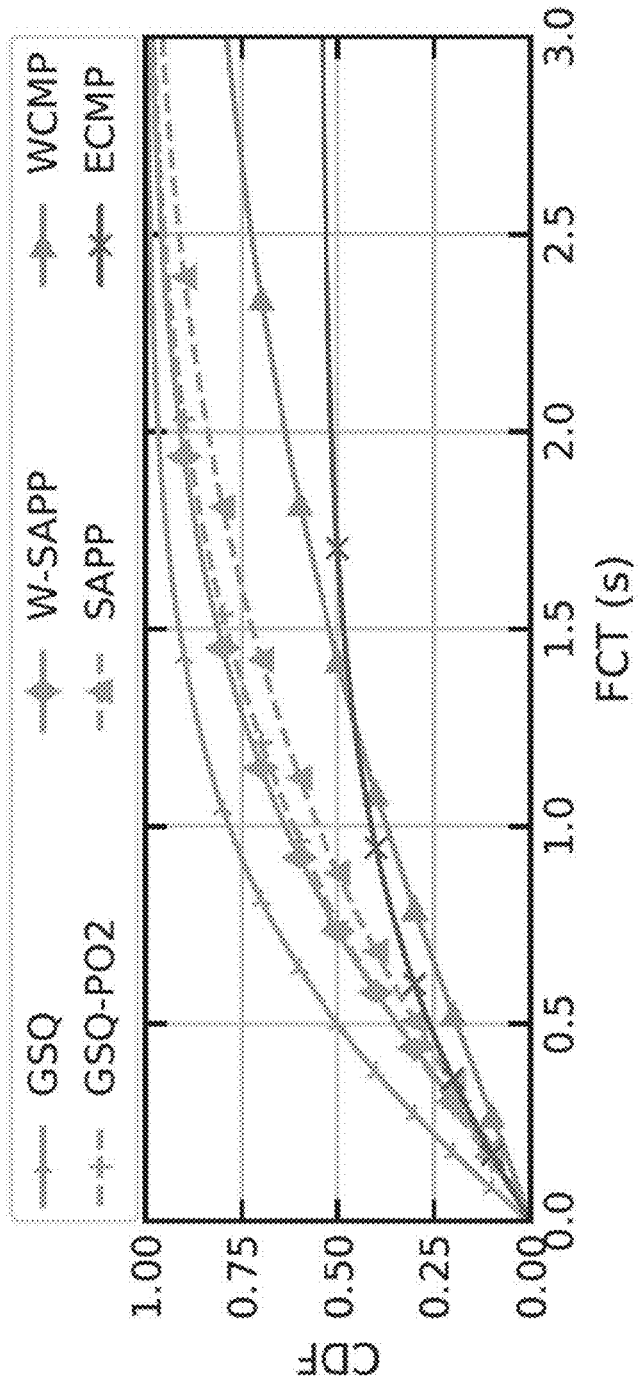
Figure 4D:
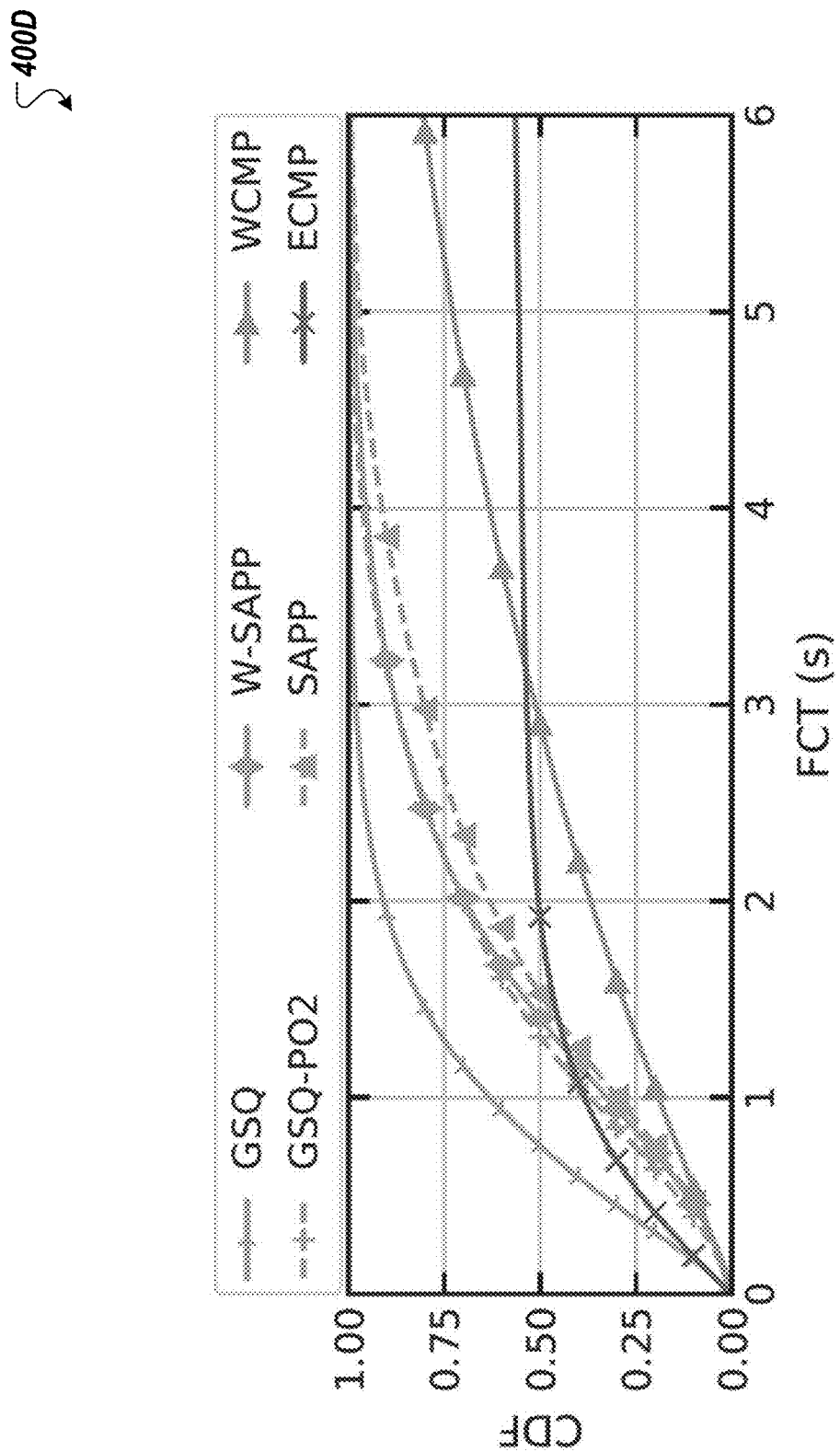

FIGS. 4A-D depict the cumulative distribution function (CDF) of FCT. In particular, FIG. 4A is a graph 400A depicting cumulative distribution function at 64.5% expected resource utilization, FIG. 4B is a graph 400B depicting cumulative distribution function at 84.5% expected resource utilization, FIG. 4C is a graph 400C depicting cumulative distribution function at 92.5% expected resource utilization, and FIG. 4D is a graph 400D depicting cumulative distribution function at 100% expected resource utilization.

In FIGS. 4A-D, different LB designs are compared. Global shortest queue (GSQ), as the name suggests, chooses the application server with the shortest queue. It is an Oracle solution that can be achieved assuming that the LBs are aware of the actual queue lengths on each server and no computational overhead is incurred when computing the minimum queue length. It represents the best performance a LB can achieve with perfect server load information. GSQ-PO2 applies power-of-2-choices over GSQ. Similar to GSQ, the LBs are assumed to be aware of the exact instant queue lengths on each server. Unlike GSQ, GSQ-PO2 selects two random server candidates and then picks the one with a shorter queue. It represents the theoretical best performance that can be achieved. ECMP randomly selects the application servers and is the most widely employed load balancing mechanism. WCMP selects the application servers based at least in part on its statically configured weights which are proportional to the server processing capacities. W-SAPP denotes the implementation of embodiments of the present disclosure. SAPP corresponds to a simplified version of certain implementations of the present disclosure, where the two server candidates are chosen using a uniform distribution instead of using weighted sampling with the Alias method. The main difference between SAPP and W-SAPP is the probabilistic method that W-SAPP applies to obtain the two choices. The weights, which are used later as probabilities, are defined using the relative processing capacities of application servers. FIGS. 4A-D demonstrate that the performances of both SAPP and W-SAPP are similar to GSQ-PO2, which is considered as the method that takes the perfect choice. Improvements can be observed for W-SAPP over SAPP, which shows the added value of using the Alias Method.

Another metric to evaluate load balancing fairness is Jain's fairness index, which computes the fairness of workload distribution. Considering n servers each one with a particular amount of flows $x_i$, the fairness index is computed as:

$$\left(\frac{\sum_{i=1}^{n} x_i}{n}\right)^2 \cdot \left(\frac{\sum_{i=1}^{n} x_i^2}{n^2}\right)^{-1}$$

The maximum and minimum values that the index can reach are respectively 1 and 1/n. If the index reaches value 1, it means that the load has been fairly distributed. The worst case is when the index is equal to 1/n which proves that only one server has taken all the flows. Using the same configuration as in previous simulations, the fairness indexes of different LB designs are computed. With reference to FIG. 5, a table 500 illustrating Jain's Fairness indexes of the different LBs at different traffic rates is provided. As shown in FIG. 5, ECMP and WCMP have the worst performance, i.e., random choices do not guarantee a fair distribution of flows. On the other hand, GSQ and GSQ-PO2 get the best fairness as they have perfect knowledge of the server states. Embodiments of the present disclosure, W-SAPP and SAPP, achieve similar performance to GSQ and GSQ-PO2. Although SAPP achieves a better fairness, it has to be taken into consideration that the probabilities that W-SAPP uses to choose server candidates are statically configured proportional to server processing capacities. The Alias Method described herein, however, uses dynamic weights to select a subset of candidates.

Another important parameter to analyze is the update time intervals of the Alias Table. If the update time interval is too high, the LB choice would not reflect the real-time load states of the application servers. For this reason, different update time intervals are simulated.

Figure 6A:
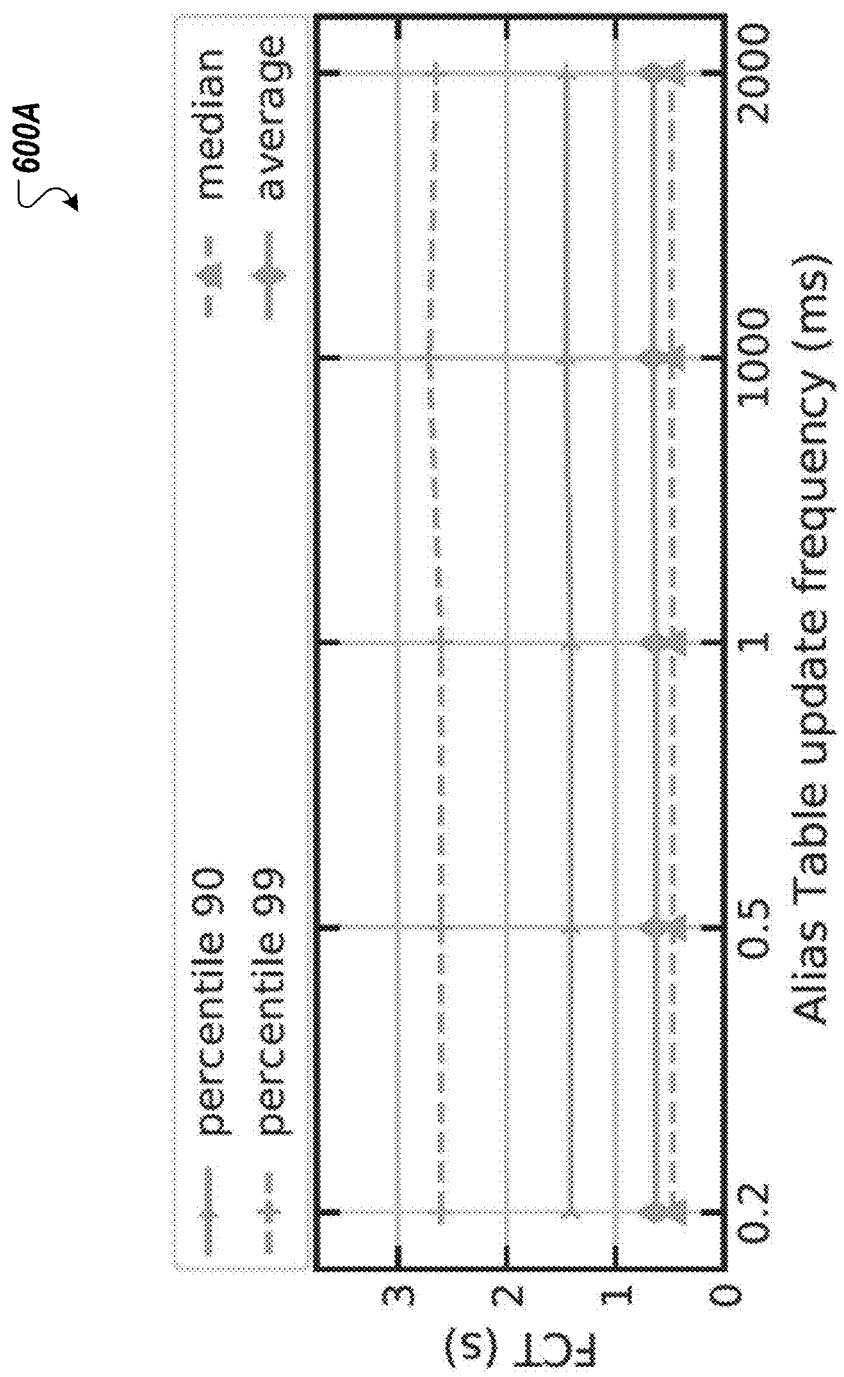
FIG. 6A and FIG. 6B are graphs depicting the results of simulations in accordance with certain embodiments of the present disclosure.
Figure 6B:
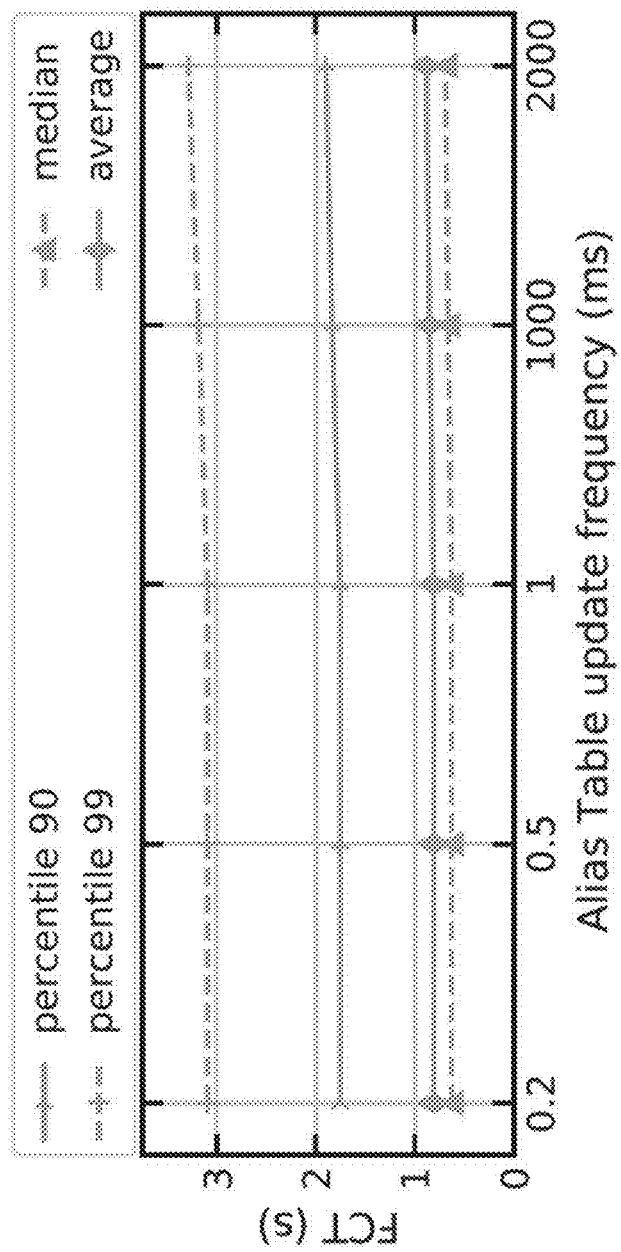

The results of the simulations are depicted in FIG. 6A and FIG. 6B. In particular, FIG. 6A and FIG. 6B are graphs 600A and 600B illustrating various Alias Table update interval LB designs at various traffic rates at 64.5% expected resource utilization and 92.5% expected resource utilization, respectively. Four values are plotted at two different traffic rates: percentile 90, percentile 99, median and average of FCT. Five different time intervals of Alias Table updates are used: 0.2 ms, 0.5 ms, 1 ms, 1 s and 2 s. The plots show a slight improvement of FCT when the update time interval is lower (higher update frequency). This difference is too small to justify shorter time interval update. The LBs are not significantly influenced by a real-time update of the weights.

Embodiments of the present disclosure provide a stateless, load-aware, hardware load balancer in DCs, which (i) fairly distributes connections' requests, (ii) guarantees PCC, and (iii) minimizes additional latency due to its presence. The design choices described herein are suitable for implementation on programmable hardware. Simulation results show that embodiments of the present disclosure improve load balancing fairness and help achieve better quality of service than other LB mechanisms. Evaluations of throughput and processing latency demonstrate the advantage of hardware implementations.

Embodiments of the present disclosure make load balancing decisions on predicted server load states based on passive feedback from the application servers with actual load states encoded in the first response of the flow/connection (e.g., TCP SYN-ACK packets, QUIC Hello packets, DTLS Hello Response packets). Multiple factors are integrated at the same time (e.g., server occupation and processing speed) so that workloads are fairly and dynamically balanced on the server clusters. The algorithm is hardware friendly and ready to be implemented on dedicated hardware devices to provide line-rate performance.

Figure 7:
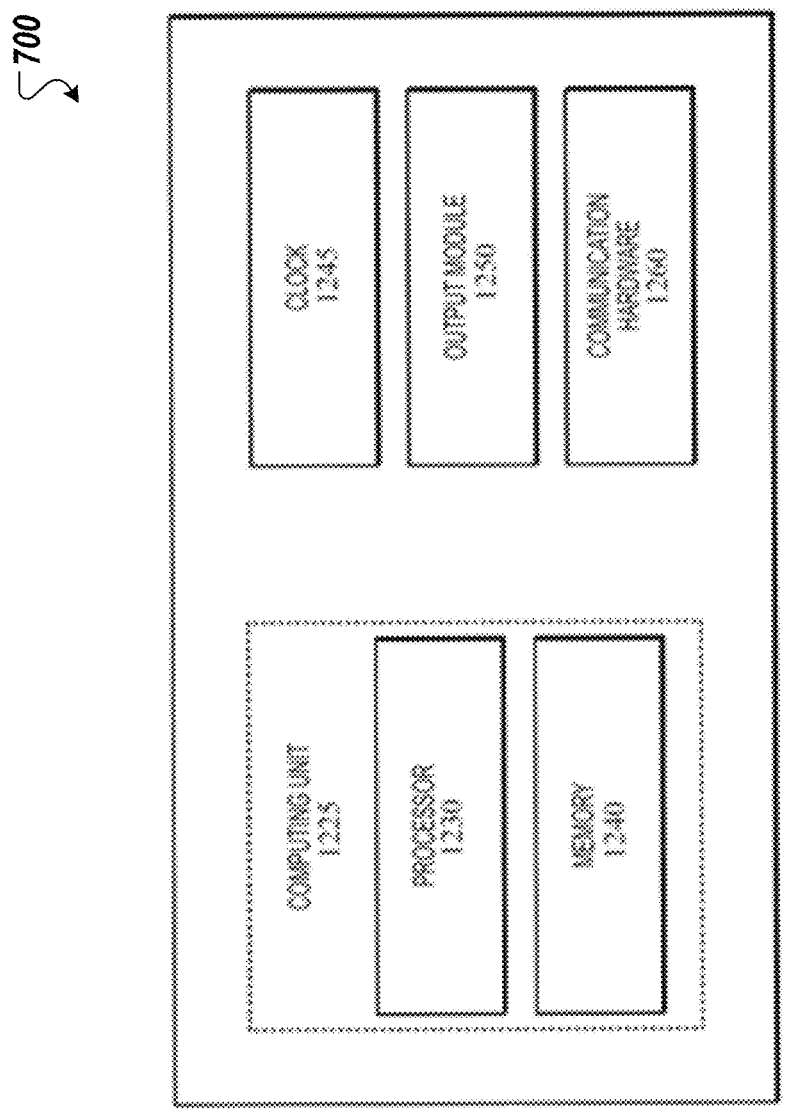
FIG. 7 is a block diagram of an example system that can be used to implement certain embodiments of the present disclosure.

Implementations described above and in relation to FIGS. 1 through 6 may be used with equipment shown in FIG. 7 that implements computerized methods as described herein. In particular, the described equipment, communicate with a computer processor configured to process one or more characteristics and/or profiles of the electrical signals received. By way of example and without limiting this disclosure to any particular hardware or software, FIG. 7 illustrates a block diagram of a system 700 herein according to one implementation.

The system 700 may include a computing unit 1225, a system clock 1245, an output module 1250 and communication hardware 1260. In its most basic form, the computing unit 1225 may include a processor 1230 and a system memory 1240. The processor 1230 may be a standard programmable processor that performs arithmetic and logic operations necessary for operation of the system 1200. The processor 1230 may be configured to execute program code encoded in tangible, computer-readable media. For example, the processor 1230 may execute program code stored in the system memory 1240, which may be volatile or non-volatile memory. The system memory 1240 is only one example of tangible, computer-readable media. In one aspect, the computing unit 1225 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 1230 the machine becomes an apparatus for practicing the disclosed subject matter.

Any combination of one or more computer readable medium(s) may be utilized. The computer readable medium may be a computer-readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer-readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the vehicle computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

It will be apparent to those skilled in the art that various modifications and variations can be made to the disclosed systems and methods for locking detected touch location in a force-based haptic multifunction switch panel. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as hard drives, or any other machine-readable storage medium wherein, when the program code is loaded into and executed by a machine, such as a computer as shown in FIG. 12, and the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of directing data traffic among computerized network devices connected over a data transmission network, comprising:
   receiving a data request;
   identifying application tasks that are currently underway at a plurality of network devices;
   calculating a current processing speed of the plurality of network devices based at least in part on the application tasks;
   receiving feedback data embedded in packet headers corresponding to data traffic flows, wherein the feedback data comprises an instant server load state score, the current processing speed and a time stamp associated with each of the plurality of network devices;
   upon receipt of the feedback data, using the feedback data to calculate weights for each of the plurality of network devices, wherein the weights correspond to load states of each respective network device of the plurality of network devices at respective times during data traffic flows;
   using a weighted sampling mechanism for selecting candidate devices from the-plurality of network devices;
   tabulating a load state score for each of the candidate devices that are available to complete the data request, wherein the load state score for a respective candidate device is a function of a previous load state score, the current processing speed of the respective candidate device, and a time value corresponding to an elapsed amount of time since the load state score was last updated;
   identifying a selected candidate device based at least in part on the tabulated load state scores to complete the data request; and
      encapsulating an identifier for the selected candidate device in the packet headers, wherein the encapsulating comprises selecting a partition method from modulo or range division based, at least in part, on a transmission protocol of a respective data traffic flow of the data traffic flows.

2. The computer implemented method of claim 1, further comprising identifying the selected candidate device based at least in part on a lowest load state score among the candidate devices.

3. The computer implemented method of claim 1, wherein receiving the data request comprises receiving the data request at an application server on the network.

4. The computer implemented method of claim 1, further comprising receiving the feedback data at a load balancer used to calculate the weights for the plurality of network devices.

5. The computer implemented method of claim 1, wherein the feedback data is embedded in at least one of TCP SYN-ACK packets, QUIC Hello packets, DTLS Hello Response, higher bits of a TCP timestamp, a key option field of a Generic Routing Encapsulation header, or least significant bits of 1Pv6 addresses.

6. The computer implemented method of claim 1, wherein the tabulating comprises evaluating a queue length at each of the candidate devices with the time value.

7. The computer implemented method of claim 1, wherein the using comprises:
   generating probabilities of use and aliases for each of the plurality of network devices, wherein the probabilities distribute packets to network devices with higher weights that correspond to lower load states;
   tabulating index values, threshold values, and the aliases in an alias table;
   associating the index values with the candidate devices;
   determining a quantity of candidate devices that should be considered for completing the respective data request or data flow;
   using the quantity as a number of respective hash functions applied to the packet for selecting respective index values within the alias table;
   responsive to identifying a new task, associating a random number with each selected respective index value;
   for each selected respective index value of the alias table, determining the respective threshold value;
   providing either the index value or the alias to a score table by comparing the random number to the threshold for a respective index value; and
   identifying a selected candidate device to complete the respective data traffic flow as the candidate device having the lowest load state score.

8. The computer implemented method of claim 1, further comprising calculating the load state score based at least in part on a formula:

$$g'=\max(0, g-v(\text{Time}(\ )-t)),$$

where g' is a new score, g is the previous load state score, v is the processing speed, and time ( ) is a function that returns a current timestamp and t is a previous timestamp.

9. The computer implemented method of claim 8, wherein: if g is 0, then assign g'=0;
if g is not 0, then compute g'; and
if g'≤0, assign g'=0, and update score g to 0.

10. The computer implemented method of claim 1, further comprising calculating the load state scores for each of the candidate devices once at initiation of the data traffic flow.

11. The computer implemented method of claim 8, wherein the previous load state score (g) is calculated based at least in part on the application tasks.

12. The computer implemented method of claim 11, wherein the previous load state score (g) is selected based at least in part on a variance threshold factor corresponding to a degree to which the application tasks on the respective network device vary in a time domain, wherein:
if the application tasks on a server side are lower than the variance threshold factor, in terms of workload, g can be defined as a current number of active connections; and
if the application tasks on the server side are greater than the variance threshold factor in terms of workload, g can be computed as a sum of expected remaining computations for CPU-bound applications or storage use for IO-bound applications.

13. The computer implemented method of claim 1, wherein the current processing speed is calculated based at least in part on the application tasks as follows:
if the application tasks are CPU-bound, the current processing speed corresponds to provisioned CPU numbers of the respective network device;
if the application tasks is pure IO-bound, the current processing speed corresponds to provisioned throughput of the respective network device;
if the application tasks are profiled in computer memory at the respective network device, the current processing speed corresponds to a previously calculated score according for available resources at the respective network device; and
if the application tasks are profiled in computer memory at the respective network device, and the application tasks are profiled as complex, the current processing speed corresponds to a moving average of sampled processing times.

14. The computer implemented method of claim 11, wherein sampled processing times comprise a time interval between outbound reply and the data request.

15. The computer implemented method of claim 1, wherein:
for connection-id of QUIC connections, assigning connection-id rand ( ) k for a connection for server k (using modulo partition);
for an IPV6 header, predefine 20-bit flow label field for each respective network device by using a different range division based on ranges [k*2^20/N, (k+1)*2^20/N-1],
where N is a number of respective network devices of the plurality of network devices and k is an identifier for the selected candidate device; and
for highest bits of TCP timestamp options, encode the identifiers for each of the respective network devices.

16. The computer implemented method of claim 1, further comprising, identifying the selected candidate device with a load balancer having a processor and computer memory storing software running the computer implemented method in P4 programming language.

17. A system for directing data traffic among computerized network devices connected over a data transmission network, comprising:
a first network device of a plurality of network devices connected to the data transmission network, the first network device having a computer processor, computer memory and software stored in the computer memory, the first network device configured to implement steps comprising:
receiving a data request;
identifying application tasks that are currently underway at the first network device;
calculating a current processing speed of the first network device based at least in part on the application tasks;
embedding feedback data in packet headers corresponding to data traffic flows from the first network device back to other network devices included in the plurality of network devices, wherein the feedback data comprises an instant server load state score, the current processing speed and a time stamp;
a second network device of the plurality of network devices connected to the data transmission network, the second network device comprising a respective computer processor, a respective computer memory and respective software stored in the respective computer memory, wherein the second network device is configured to implement respective steps comprising:
receiving the feedback data;
using the feedback data to calculate weights for respective network devices of the plurality of network devices, wherein the weights correspond to load states of each respective network device at respective times during the data traffic flows;
using a weighted sampling mechanism for randomly selecting candidate devices from the respective network devices;
tabulating a load state score for each of the candidate devices that are available to complete a respective data traffic flow, wherein the load state score for a respective candidate device is a function of a previous load state score for the respective candidate device, the current processing speed of the respective candidate device, and a time value corresponding to an elapsed amount of time since the load state score was last updated;
identifying a selected candidate device to complete a respective data traffic flow of the data traffic flows; and
encapsulating an identifier for the selected candidate device in the packet headers, wherein the encapsulating comprises selectin a partition method from modulo or range division based, at least in part, on a transmission protocol of a respective data traffic flow of the data traffic flows.

18. The system of claim 17, wherein the current processing speed is calculated based at least in part on the application tasks as follows:
if the application tasks are CPU-bound, the current processing speed corresponds to provisioned CPU numbers of the first network device;

if the application tasks are pure IO-bound, the current processing speed corresponds to provisioned throughput of the first network device;

if the application tasks are profiled in the computer memory at the first network device, the current processing speed corresponds to a previously calculated score according for available resources at the first network device; and if the application tasks are profiled in the computer memory at the first network device, and the application tasks are profiled as complex, the current processing speed corresponds to a moving average of sampled processing times.

* * * * *

UNITED STATES PATENT AND TRADEMARK OFFICE
CERTIFICATE OF CORRECTION

PATENT NO. : 12,348,422 B1
APPLICATION NO. : 18/153865
DATED : July 1, 2025
INVENTOR(S) : Zhiyuan Yao et al.

Page 1 of 2

It is certified that error appears in the above-identified patent and that said Letters Patent is hereby corrected as shown below:

In the Specification

Under Column no. 2, Line no. 31, Replace:
"IPV6"
With:
--IPv6--

Under Column no. 3, Line no. 47, Replace:
"( ) k"
With:
--( )*k--

Under Column no. 6, Line no. 16, Replace:
"(QOS)"
With:
--(QoS)--

Under Column no. 6, Line no. 62, Replace:
"(DOS)"
With:
--(DoS)--

Under Column no. 6, Line no. 66, Replace:
"(QOS)."
With:
--(QoS).--

Under Column no. 11, Line no. 65, Replace:
"Od"

Signed and Sealed this
Second Day of September, 2025

Coke Morgan Stewart
*Acting Director of the United States Patent and Trademark Office*

With:
--0d--

Under Column no. 13, Line no. 37, Replace:
"IPV6."
With:
--IPv6.--

Under Column no. 13, Line no. 52, Replace:
"IPV6"
With:
--IPv6--

Under Column no. 13, Line no. 65, Replace:
"() k"
With:
--()*k--

Under Column no. 14, Line no. 8, Replace:
"IPV6's"
With:
--IPv6's--

Under Column no. 14, Line no. 13, Replace:
"IPV6,"
With:
--IPv6,--

In the Claims

Under Column no. 21, Claim 15, Line no. 59, Replace:
"() k"
With:
--()*k--

Under Column no. 21, Claim 15, Line no. 61, Replace:
"IPV6"
With:
--IPv6--

Under Column no. 22, Claim 17, Line no. 58, Replace:
"selectin"
With:
--selecting--